Oct. 6, 1970   R. T. CORNELIUS   3,532,505
METHOD FOR DISPENSING COFFEE BEVERAGE
Filed July 14, 1966
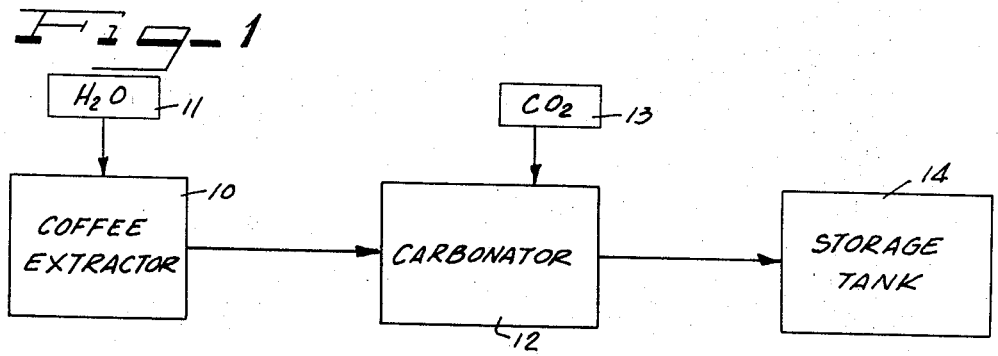
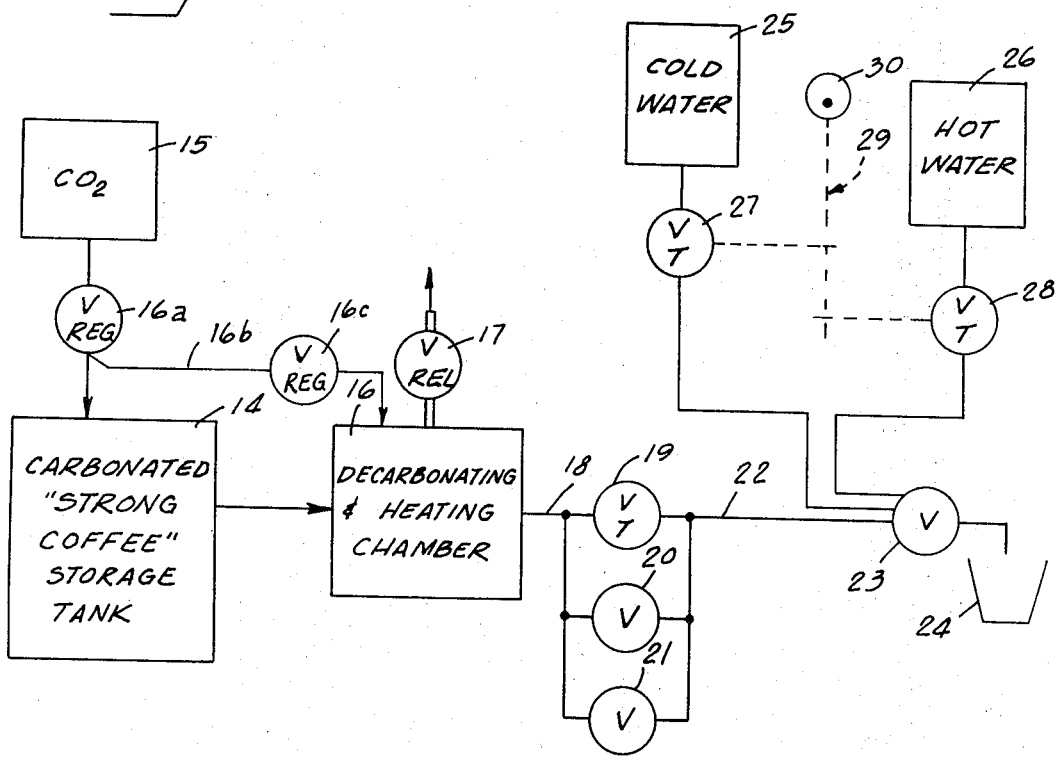
INVENTOR.
RICHARD T. CORNELIUS
BY *Kill, Sherman, ......* ATTORNEYS

United States Patent Office 3,532,505
Patented Oct. 6, 1970

3,532,505
METHOD FOR DISPENSING COFFEE BEVERAGE
Richard T. Cornelius, Minneapolis, Minn., assignor to The Cornelius Company, Anoka, Minn., a corporation of Minnesota
Filed July 14, 1966, Ser. No. 565,265
Int. Cl. A23f 1/08
U.S. Cl. 99—71                                    5 Claims

ABSTRACT OF THE DISCLOSURE

Method and means are provided wherein a supply of liquid coffee of a concentration which is too high for consumption is stored in a carbonated condition, a portion thereof being transferred to a decarbonating and heating chamber from which the concentrated coffee is conducted at an adjustably selected rate to a mixing valve. Heated water and unheated water are added to the mixing valve in a proportion which is simultaneously adjusted, so that when the mixing valve is opened, a serving of coffee beverage is obtained having selected strength and having selected temperature.

This invention relates generally to a method for dispensing coffee beverage, and more specifically involves the use of a strong liquid coffee as hereafter defined.

Although the principles of the present invention may be practiced in various manners and included in various devices, a particularly useful application is made in a coffee vending machine of the coin-operated type.

In the art as presently known regarding the dispensing of coffee, a coffee beverage dispensed from a particular vending machine is of predetermined strength and temperature, and the purchaser is not afforded an option as to either of these variables. Moreover, coffee dispensing machines of relatively high capacity occupy considerable space.

Accordingly, it is an object of the present invention to provide an improved method for dispensing coffee beverage.

Another object of the present invention is to provide a method by which the user may exercise a choice in selecting the temperature of the coffee to be dispensed.

A further object of the present invention is to provide a method by which the purchaser may exercise some choice in the strength of the coffee beverage to be dispensed.

Many other advantages, features and additional objects of the present invention will become manifest to those versed in the art upon making reference to the detailed description and the accompanying sheet of drawings in which a preferred structural embodiment incorporating the principles of the present invention is shown by way of illustrative example.

ON THE DRAWINGS

FIG. 1 is a diagram of method and apparatus for preparing coffee beverage of a special type; and FIG. 2 is a diagram of method and apparatus for dispensing coffee beverage in accordance with the principles of the present invention.

As shown on the drawings

The method and apparatus for dispensing coffee beverage which is shown diagrammatically in FIG. 2 contemplates the utilization of a special "strong coffee" beverage which may be prepared in the following manner, an understanding of which is helpful in fully appreciating the diagram of FIG. 2.

As shown in FIG. 1, ground roasted coffee beans of any selected type are disposed in an extractor 10 which is connected to a supply of hot water 11. A quantity of hot water is forced from the supply 11 through the bed of ground coffee in the extractor 10. The temperature of this water is such as to be hot to the touch, but below 212° F. As the water passes through the extractor 10, it becomes cooled by the ground coffee so that it discharges at a temperature which would be considered too low for consumption, which could be approximately described as being lukewarm. A relatively small quantity of water is passed through the coffee grounds so that an unusually strong infusion is created which has a concentration that is too high for consumption and which is referred to herein as "strong coffee." To facilitate an understanding of the quantity of water utilized, if the "strong coffee" beverage were to be consumed immediately, it would then be diluted so that the strong coffee would represent approximately 15 to 30% of the ultimate beverage volume, such ultimate volume being a coffee beverage infusion of normal strength. If desired, the strong coffee beverage could be used immediately in accordance with further principles of the present invention without further preliminary treatment. However, if the strong coffee beverage is not to be consumed within the time that freshly brewed coffee is normally consumed, the strong coffee beverage is conducted to a carbonator 12 where the strong coffee beverage is subjected to gaseous carbon dioxide which is provided from a source 13 thereof. As the temperature of the strong coffee in the carbonator is not significantly above room temperature, the carbonation is readily effected, and the carbonated strong coffee is then transferred to a portable storage tank 14. The tank 14 is sealed, and may be stored an indefinite period of time without heat or refrigeration, and may be transferred to another location where a dispensing machine is situated.

FIG. 2 illustrates the preferred components of this invention as the same is embodied in a coffee dispensing machine of the coin-operated type. The storage tank 14 comprises a supply of liquid strong coffee beverage, which beverage has a concentration that is too high for consumption. The storage tank 14 is connected to a supply of carbon dioxide gas 15 by means of a pressure regulating valve 16a. The valve 16a is so set that carbon dioxide gas pressure is applied to the contents of the storage tank at such pressure as to maintain, or so as to substantially maintain, the carbonation that was initially provided by the carbonator 12. While the carbonated strong coffee will keep in the storage tank without external pressurization when the tank is full, once the tank is partially emptied, a replenishment of the carbon dioxide gas in the space above the remaining carbonated strong coffee is necessary, and the supply 15 and valve 16a provide such replacement. Furthermore, the pressure thus afforded in the storage tank 14 effects transfer thereof to a heating and decarbonating chamber 16. A relatively small quantity is thus transferred from the storage tank 14 to the chamber 16, where such quantity or portion is heated. The heating makes the carbonation of the strong coffee unstable, and in fact drives off substantially all of the dissolved carbon dioxide gas, which then collects above the liquid within the chamber 16. A relief valve 17 is set to crack or to relieve at a pressure slightly above atmospheric, so that a very small pressure is maintained in the heating chamber for two purposes. This slight pressure assists in the further transfer of the liquid, and also serves to extend substantially the keeping time of the decarbonated strong coffee, during which time the strong coffee is thus stored in a ready-to-use condition. The pressurizing carbon dioxide gas for the chamber 16 is thus derived from the beverage concentrate. The concentrate, when decarbonated, normally remains in the chamber 16 for a sufficient period of time to allow the temporary foam that is created by the decarbonation to break up and to separate as gas and as liquid. In the event that the slight pressure in the chamber 16 were lost, as by jiggling of a gravity-type of relief valve 17, such gas would be replenished by an auxiliary carbon dioxide gas line 16b having a pressure regulator valve 16c set to provide a pressure in the chamber 16 below the reseating pressure of the relief valve 17.

The liquid portion of the contents of the chamber 16, namely the decarbonated strong coffee, is then conducted by a line 18 to each of three valves 19, 20 and 21. The outlets of the valves 19–21 are connected together and lead through a line 22 to a mixing valve 23 which discharges into a receptacle 24. The valve 19 is a throttling valve and is always open to allow a predetermined amount of liquid strong coffee to flow therethrough in a given period of time. The valves 20 and 21 are preferably solenoid-operated, and controls (not shown) are provided for the user to select the strength of the coffee desired by determining whether neither of the valves 20, 21 is to be energized, whether one of the valves 20 and 21 is to be energized, or whether both of the valves 20 and 21 are to be energized. The relative capacities of the valves 19–21 are such that with the valve 19 serving alone to conduct strong coffee, the ultimate serving is relatively weak, and would be termed "weak coffee" by the consumer. When one of the valves 20, 21 is energized with the valve 19, the strength of the resultant coffee would be considered as being "normal" by the consumer. Thus the valve 19 in combination with one of the valves 20, 21 is so arranged and adjusted as to effect delivery of a cup or quantity of coffee of normal strength, which can be adjustably made weaker by eliminating any strong coffee flow through a valve parallel to the valve 19. When both of the valves 20 and 21 are open, the quantity of strong coffee that will be delivered to the receptacle 24 is such that when diluted as described below, it will still constitute a rather strong beverage, for example of the "expresso" type. The valves 19–21 thus comprise means by which the rate of flow for a given period of time, and hence the ultimate coffee strength, may be selected or adjusted.

The mixing valve 23 is arranged to add water to the heated "strong coffee." For this purpose, a supply of cold water 25 and a supply of hot water 26 are respectively connected by a pair of valves 27, 28 to deliver both cold and hot water to the mixing valve 23. An interconnection 29 is provided between the valves 27 and 28, such interconnection being diagrammatically illustrated as a rod carried on a rotatably mounted eccentric selector knob 30. When the knob 30 is rotated about its center, the selector rod reciprocates. One direction of reciprocation opens one of the valves 27 while it closes the other valve 28, while oppositely directed reciprocation has an opposite effect. The cold water source 25 and the hot water source 26 need not be an integral part of the dispensing system, and the cold water source may have the temperature of ordinary tap water.

With heavy usage, there is a possibility that some foam may be conducted through the line 18, the valves 19–21, and the line 22 to the mixing valve 23. If the hot water from the valve 28 is discharged within the mixing valve 23 in the form of a spray that is directed so as to impinge against any such foam, such foam is readily broken up. The valve 23, in a less preferred form, may discharge the "strong coffee," the cold water and the hot water into the receptacle 24 where mixing may take place or be augmented.

The valves 27, 28 have been illustrated as being infinitely variable. Such feature is also usuable in place of the valves 19–21. Discrete predetermined relative rates of flow are provided by the valves 19–21, a feature that may be utilized in proportioning the amount of hot and cold water in place of the valves 27, 28.

The valves 27, 28 thus may be manually adjusted to enable the purchaser to select the serving temperature of the mixed beverage in the receptacle 24.

When this invention is embodied in a coin-controlled dispenser machine, control of the valve 23 is provided by a timer (not shown) which opens the valve 23 for a predetermined period of time. For this reason, it is preferred that the combined rate of water flow through the valves 27, 28 be maintained at a fixed rate.

As the amount of liquid beverage dispensed in the receptacle 24, of normal serving strength, will be derived or supplied from the storage tank 14 only to the extent of 15 to 30% of such liquid, it is evident that a relatively small storage volume will enable the dispensing of a relatively large volume of coffee beverage at serving strength and serving temperature. Moreover, such temperature may be varied to suit the taste of the purchaser, and the strength thereof may likewise be varied. Such apparatus has high capacity and uses relatively little space when compared to such capacity.

As most of the liquid is derived from the water sources 25, 26 these can be connected to domestic-type of supplies which would provide large water reserves, thereby enabling virtually steady usage of the apparatus even though a relatively small heater were employed in the chamber 16.

The term "strong coffee" as used herein relates to that type of nonpotable coffee infusion which has been prepared to be like that described herein, as distinguished from prior coffee extracts, syrups or concentrates, or infusions of strong potable strength.

The space-saving aspects of this invention are particularly important. Assuming that the "strong coffee" is diluted by the addition of four volumes of water, a system constructed in accordance with this invention having a certain storage capacity in the tank or tanks 14 will have the same ultimate dispensing capacity without servicing as a machine having five times such storage capacity in which dilution is not practiced.

Although various minor modifications might be suggested by those versed in the art, it should be understood that I wish to embody within the scope of the patent warranted hereon, all such embodiments as reasonably and properly come within the scope of my contribution to the art.

I claim as my invention:

1. A method of dispensing a serving of coffee beverage for immediate consumption, comprising:
    (a) storing a supply of coffee beverage of a concentration which is too high for consumption;
    (b) for each serving, selecting the desired serving strength and selecting the desired serving temperature;
    (c) conducting the concentrated beverage to a receptacle at a volumetric rate which is at least a pre-set minimum for providing at least a minimum serving strength, and supplementing said rate of flow to the extent required by said strength selection, and while doing so, adding heated water to the receptacle at a fixed volumetric rate for providing a maximum serving temperature; and
    (d) partially substituting unheated water for heated water to the extent required by said temperature selection while maintaining said fixed rate of water flow for the combined flow of heated and unheated water.

2. A method of dispensing a coffee beverage as set forth in claim 1, in which the supply of coffee beverage provided is previously carbonated, and is subjected to heat for effecting decarbonation of such beverage prior to the addition of the heated water.

3. A method of dispensing a coffee beverage as set forth in claim 2, in which the heated water is added to the beverage by spraying of the heated water.

4. A method of dispensing a coffee beverage as set forth in claim 2, in which the heated decarbonated coffee beverage is stored in a ready-to-use condition for an indefinite period of time.

5. A method of dispensing a coffee beverage as set forth in claim 2, in which the supply of previously carbonated coffee beverage is stored for an indefinite period of time without heat or refrigeration, and under an atmosphere of carbon dioxide gas of a pressure sufficient to substantially maintain the carbonation thereof, and from which supply a portion is removed to be subjected to said heat.

References Cited

UNITED STATES PATENTS

| | | | |
|---|---|---|---|
| 1,627,147 | 5/1927 | Clark | 222—144.5 |
| 2,592,279 | 4/1952 | Heier | 222—145 |
| 1,602,632 | 10/1926 | Zorn | 210—210 |
| 2,682,984 | 7/1954 | Melikian et al. | 221—96 |
| 3,105,616 | 10/1963 | Krup | 222—146 |
| 3,123,255 | 3/1964 | Martin | 222—146 |
| 3,200,997 | 8/1965 | Creswick | 222—146 |

FOREIGN PATENTS 529    1882    Great Britain.

MAURICE W. GREENSTEIN, Primary Examiner

U.S. Cl. X.R.

99—281, 282; 222—146